Aug. 6, 1929.　　　J. H. McNABB　　　1,723,701
OPTICAL DEVICE
Filed April 30, 1927
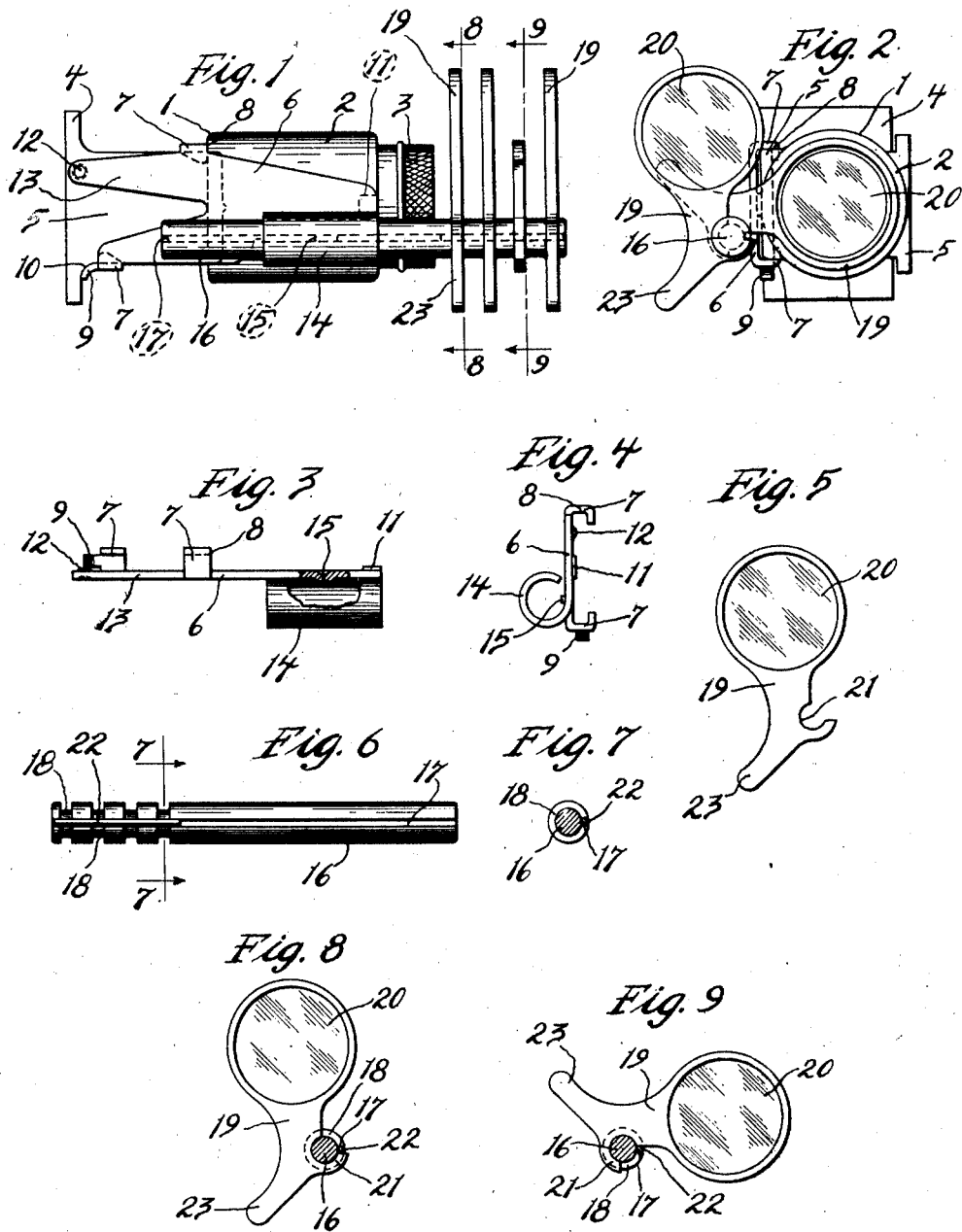
Inventor:
Joseph H. McNabb
By Miehle & Miehle,
attys.

Patented Aug. 6, 1929.

1,723,701

UNITED STATES PATENT OFFICE.

JOSEPH H. McNABB, OF WINNETKA, ILLINOIS, ASSIGNOR TO THE BELL & HOWELL COMPANY, OF CHICAGO, ILLINOIS, A CORPORATION OF ILLINOIS.

OPTICAL DEVICE.

Application filed April 30, 1927. Serial No. 187,794.

My invention relates particularly to color screens for motion picture projecting machines although not limited to this use alone.

The main objects of my invention relate to the provision of a simple, effective and convenient optical device which is particularly adapted for color screens of motion picture projecting machines, and which in its preferred embodiment is adapted for detachable mounting in a convenient manner on optical machines with which it is used with a view toward providing the device in the form of an attachment.

With these objects in view my invention consists in certain features of novelty in the construction, combination, and arrangement of parts by which the said objects and certain other objects, hereinafter appearing, are effected, all as fully described with reference to the accompanying drawing and more particularly pointed out in the appended claims.

Referring to the drawing—

Figure 1 is a side elevation of the preferred embodiment of my invention showing it attached on the projection lens mount of a motion picture machine, as hereinafter described;

Figure 2 is a front elevation of the same;

Figure 3 is a top plan view of the attachment bracket, hereinafter described, with a portion thereof broken away;

Figure 4 is a front elevation of the attachment bracket;

Figure 5 is a front elevation of one of the color screen devices, hereinafter described;

Figure 6 is a side elevation of the supporting shaft, hereinafter described;

Figure 7 is a sectional view taken on the line 7—7 of Figure 6;

Figure 8 is a sectional view taken on the line 8—8 of Figure 1;

Figure 9 is a sectional view taken on the line 9—9 of Figure 1.

Like characters of reference indicate like parts in the several views.

Referring to the drawing 1 designates the projection lens mount member of a motion picture projecting machine. The forward portion of the lens mount member is of cylindrical formation, as designated at 2, in which a projection lens 3 is mounted for longitudinal adjustment, and the rear portion of the lens mount member is in the form of a transverse vertically extending film gate portion 4 connected to the cylindrical portion 3 by two vertically disposed connecting portions 5 disposed at opposite sides of the axis of the projecting lens. See Figures 1 and 2.

A bracket 6, preferably formed of sheet metal, is provided at opposite edges of the main portion thereof with opposing hook formations 7 which are adapted to engage over the top and bottom portions of the outer connecting portion 5 of the lens mount member, see Figures 1, 2, 3, and 4, the upper hook formation being disposed forwardly of the lower hook formation, so that upward angular movement of the bracket 6 on a rearwardly disposed axis serves to disengage the bracket from the lens mount member and the opposite angular movement of the bracket serves to engage the bracket on the lens mount member. The front surface 8 of the forward hook formation 7 forms a stop which engages the rearwardly facing surface of the portion of the outer connecting portion 5 of the lens mount member where it merges with the cylindrical portion 2 of the lens mount member to limit forward movement of the bracket with respect to the lens mount member, and a lateral extension 9 on the transverse portion of the rear hook formation 7 extends rearwardly therefrom and is curved in a direction away from this hook formation to engage a curved juncture portion 10 between said outer connecting portion 5 and the rear film gate portion 4 of the lens mount member to limit rearward movement of the bracket with respect to the lens mount member. A contact portion 11 is formed on the forward portion of the bracket 6 and faces the plane of the hook formations 7 to engage the cylindrical portion 2 of the lens mount member, and a second contact portion 12 is formed on the rear end of the bracket 6 and faces the plane of the hook formations 7 correspondingly with the contact portion 11 to engage the corresponding surface of the lens mount member at the rear end thereof, these contact portions being spaced with the hook formations 7 therebetween to react thereon. The rear contact portion 12 is disposed on the rear end of a comparatively slender extension portion 13 of the bracket whereby sufficient resiliency is afforded to accommodate variations of the lens mount member 1 and to insure stability of the bracekt on the lens mount member. Thus is the bracket 6 detachably mounted in a predetermined position on the lens mount member 1, the structure affording convenient attachment and detachment of the bracket.

The forward lower portion of the bracket 6 is formed circularly on a forwardly and rearwardly extending axis, as designated at 14, to provide a correspondingly disposed bore, and a key 15 is formed from the metal of the bracket and projects into this bore. See Figures 1, 3, and 4. This bore is disposed parallel with the optical axis of the projection machine or the lens 3, and a shaft 16, provided with a longitudinal keyway 17, is engaged for longitudinal movement in said bore with the key 15 engaged in the keyway 17 to prevent angular movement of the shaft with respect to the bracket. See Figures 1, 2, 6, and 7. The shaft 16 is provided adjacent its front end with a plurality of spaced circumferential grooves 18. A like plurality of color screens, consisting of metal frames 19 in which are mounted lenses 20 of different colors, are provided, and these frames 19 are provided with interrupted bearing formations 21 which engage in respective of the grooves 18 of the shaft 16 for the independent pivotal mounting of the color screens on the shaft in coaxial relation, the bearing formations 21 being expanded and then contracted in the grooves 18 in the assembly of the color screens on the shaft. A key 22 is secured in a usual manner in the keyway 17 of the shaft 16 and extends across the grooves 18 and cooperates with the interrupted bearing formations 21 to limit pivotal movement of the color screens with respect to the shaft 16. See Figures 1, 2, 5, 6, 7, 8, and 9. Extension fingers 23 are formed on the frames 19 for the convenient manipulation of the color screens.

Figures 1 and 2 show the color screens with all but one color screen out of functioning relation with the projection lens 3, the remaining color screen being shown in functioning relation with the lens. By reason of the fact that the color screens are independently movable any number may be moved into functioning relation with the projection lens 3, thus affording a wide variety of color combinations. Figure 8 shows a color screen in non-functioning position and Figure 9 shows a color screen in functioning relation, the key 22 serving to limit movement of the color screens in both positions. The slidable mounting of the shaft 16 on the bracket 6 permits adjustment of the color screens longitudinally of the axis of the projection lens 3. The influence of gravity serves in the embodiment shown to maintain the color screens in both functioning and non-functioning positions by reason of the fact that the major weight of the color screens is disposed on opposite sides of the vertical axial plane of the screens in the functioning and non-functioning positions thereof.

While I have herein shown and particularly described my invention in its preferred embodiment I do not wish to be limited to the precise details thereof as changes may readily be made without departing from the spirit of my invention, but having thus described my invention I claim as new and desire to secure by Letters Patent the following:

Claims—

1. In a device of the character described the combination of a support, means on said support for detachably mounting the same on a lens mount member of an optical machine, and a color screen carried with said support and mounted for movement with respect thereto into and out of functioning relation with and in front of a projection lens mounted on said lens mount member when said support is mounted on said lens mount member.

2. In a device of the character described the combination of a support, means on said support for detachably mounting the same on a lens mount member of an optical machine, and a plurality of color screens of different colors carried with said support and mounted for independent pivotal movement on a common axis parallel to that of a projection lens mounted on said lens mount member into and out of functioning relation with and in front of said lens when said support is mounted on said lens mount member.

3. In a device of the character described the combination of a bracket, opposed hook devices on said bracket for mounting the same upon an optical machine, a shaft carried by said bracket and fixed against rotation with respect thereto, an optical device mounted on said shaft for pivotal movement, and stop means limiting pivotal movement of said optical device with respect to said shaft.

4. In a device of the character described the combination of a bracket, means for detachably mounting said bracket in a predetermined position on an optical machine including opposed hook devices, opposite stops on said hook devices including a lateral extension on the transverse portion of one of said hook devices and curved in a direction away from this hook device and contact portions on the bracket facing the plane of said hook devices correspondingly and spaced with said hook devices therebetween, and an optical device carried with said bracket and mounted for movement with respect thereto into and out of functioning relation with said optical machine when said bracket is mounted on the machine.

5. In a device of the character described the combination of a bracket provided with a bore, means for detachably mounting said bracket in a predetermined position on an optical machine with said bore disposed parallel with the optical axis of the machine including opposed hook devices, opposite stops on said hook devices including a lateral extension on the transverse portion of one of said hook devices and curved in a direction away from this hook device and contact portions on the bracket facing the plane of said hook devices correspondingly and spaced with said hook devices therebetween, a plurality of color screens of different colors, and means whereby said color screens are carried with said bracket for independent pivotal movement into and out of functioning relation with the optical axis of said machine including a shaft engaged in said bore.

6. In a device of the character described the combination of a support, a shaft mounted on said support for longitudinal movement and fixed against rotation with respect thereto, an optical device mounted on said shaft for pivotal movement with respect thereto, and stop means limiting pivotal movement of said optical device with respect to said shaft.

7. In a device of the character described the combination with a bracket, means for detachably mounting said bracket in a predetermined position on an optical machine, a shaft mounted on said bracket for longitudinal movement and fixed against rotation with respect thereto and disposed, when the bracket is mounted on said optical machine, in parallelism with the optical axis of said machine, a plurality of optical devices pivotally mounted on said shaft for independent movement into and out of functioning relation with said optical axis, and stop means limiting pivotal movement of said optical devices with respect to said shaft.

8. In a device of the character described the combination of a shaft provided with a longitudinal keyway, a plurality of spaced circumferential grooves on said shaft, a plurality of optical devices provided with interrupted bearing formations engaged in said grooves for the pivotal mounting of said optical devices on the shaft, and a key secured in said keyway and extending across said grooves and cooperating with said interrupted bearing formations to limit pivotal movement of said optical devices with respect to said shaft.

9. In a device of the character described the combination of a bracket provided with a bore having a key therein, means for detachably mounting said bracket in a predetermined position on an optical machine with said bore parallel with the optical axis of the machine, a shaft provided with a longitudinal keyway and engaged for longitudinal movement in said bore with said key engaged in said keyway, a plurality of spaced circumferential grooves on said shaft, a plurality of optical devices provided with interrupted bearing formations engaged in said grooves for the pivotal mounting of said optical devices on the shaft, and a key secured in said keyway and extending across said grooves and cooperating with said interrupted bearing formations to limit pivotal movement of said optical devices with respect to said shaft.

In witness whereof I hereunto affix my signature this 16th day of April, 1927.

JOSEPH H. McNABB.